UNITED STATES PATENT OFFICE.

EMIL NAUMANN, OF COLOGNE, GERMANY.

PROCESS OF PRODUCING AMMONIUM CHLORID.

No. 892,178.	Specification of Letters Patent.	Patented June 30, 1908.

Application filed January 17, 1908. Serial No. 411,208.

*To all whom it may concern:*

Be it known that I, EMIL NAUMANN, a subject of the German Emperor, and a resident of Cologne, in the Kingdom of Prussia, Germany, have invented certain new and useful Improvements in Processes of Producing Chlorid of Ammonium, of which the following is a specification.

This invention has reference to a novel process of producing chlorid of ammonium or sal ammoniac from sulfate of ammonium and chlorid of sodium in a hot aqueous solution.

It is the special object of this invention to produce a pure ammonium chlorid.

The methods heretofore known for producing ammonium chlorid or sal ammoniac of a high grade in hot aqueous solutions did attain this intended result only in an indirect manner because considerable quantities of sulfate formed during the process will crystallize out with the chlorid of ammonium when hot solutions containing the ammonium chlorid and sulfate of sodium are allowed to cool off. This necessitates a separation of the ammonium chlorid from the sulfate of sodium which is a rather tedious operation and reduces considerably the percentage of pure ammonium chlorid so that at present hardly any quantities of sal ammoniac are produced according to this method.

According to the known recipes molecular proportions of sulfate of ammonium and chlorid of sodium are allowed to react in a hot aqueous solution and care is taken to have the final concentration equal to a saturation with ammonium chlorid, for the solution is finally evaporated until an iridescent fine film of ammonium chlorid appears on the surface. Solutions obtained in this manner contain to 100 parts of water the components of about 90 parts of ammonium chlorid as well as the components of about 35 parts or more sulfate of sodium. During the cooling off to ordinary temperature of such a hot solution containing the components for both salts, the chlorid of ammonium crystallizes out and also about two-fifths of the sulfate of sodium present which is an impurity to the chlorid of ammonium.

According to this invention the water present at the end of the reaction is so calculated that a solution is obtained containing a considerably smaller percentage of chlorid of ammonium than one saturated according to old methods at boiling temperature. Assuming that a solution has been prepared of such concentration as required for the purpose of this invention and that the chlorid of sodium is in excess of the molecular proportion, the reaction between the quantity of sulfate of ammonium employed and a corresponding molecular proportion of chlorid of sodium takes place exactly as before when no excess of chlorid of sodium was present. From the excess of sodium chlorid additional quantities enter the reactive solution and displace therein part of the formed sulfate of sodium with the result of reducing the quantity of same. This reduction is in proportion to the portion of the excess of sodium chlorid which enters the solution. By keeping the concentration of the solution within certain limits, the reduction of the formed sodium sulfate will be such that the hot reactive solution upon cooling to normal temperature will yield not only a grade of crystallized chlorid of ammonium which contains considerably less of the sulfate of sodium than formerly obtained according to known methods, but the water present will keep in solution at normal temperature all the sulfate of sodium which remained in solution at the temperature at which the reaction took place, so that, upon cooling off such a solution an ammonium chlorid crystallizes out which is free from sulfate.

The reactive solutions obtained according to the known methods all show the same undesirable high percentage of sulfate of sodium, no matter whether to a quantity of sulfate of ammonium employed a molecular proportion of chlorid of sodium is used or a great excess of same. In the resulting highly concentrated solution of the chlorid of ammonium the chlorid of sodium cannot exist in solution.

If reactive solutions obtained from molecular proportions of sulfate of ammonium and chlorid of sodium shall possess the power of dissolving even a smaller quantity of the excessive sodium chlorid, the quantity of water for which the batch must be calculated so that finally a solution is obtained containing a considerably smaller percentage of chlorid of ammonium than corresponds to a quantity of 90 parts of chlorid of ammonium in 100 parts of water. The reactive solutions show then a power of dissolving excessive chlorid of sodium which increases in proportion to the reduction of the concentration of the ammonium chlorid.

In order to render it possible to obtain reactive solutions whose power of dissolving excessive sodium chlorid permits of adding such a quantity of sodium chlorid as will be sufficient to effect an economical reduction of the quantity of the undesirable sulfate, it is necessary to work with solutions of less concentration than corresponds to 75 parts of ammonium chlorid in 100 parts of water. If, however, the quantity of water is so calculated that a final solution is obtained containing about 60 parts of ammonium chlorid or less in 100 parts of water and to such solution an excess of sodium chlorid is added according to 15 parts in 100 parts of water of the final reactive solution, then the conditions are such that a sufficient quantity of excessive chlorid of sodium is taken up by the hot reactive solution. By this the quantity of sulfate of sodium has been so greatly reduced that the water now present will hold in solution all the sulfate even if the temperature has been lowered to 17° C. and during the cooling ammonium chlorid crystallizes out which is free from sulfate.

Regarding the physical conditions under which the water and the ammonium sulfate and sodium chlorid of a batch react, it is immaterial for the final result whether the suitable concentration is obtained by adding at the beginning a corresponding quantity of water to the sulfate of ammonium and chlorid of sodium, or whether an excess of water is used at the start which is later on evaporated while the reaction takes place.

Example: A solution of about 60 parts of ammonium sulfate in 100 parts of water corresponding to a probable concentration of about 50 parts of ammonium chlorid in 100 parts of water is heated to a temperature of 70° C. or more and an excess of sodium chlorid in solid form added while stirring. The excess of sodium chlorid is advantageously calculated to be about 15 parts to 100 parts of the water present. After the reaction has taken place between the ammonium sulfate and a molecular proportion of sodium chlorid there is still a sufficient excess of sodium chlorid which dissolves in effective quantities in a short time. The reaction is finished in about one to two hours according to the grade of fineness of the sodium chlorid employed and the intensity of stirring.

The quantity of sodium sulfate has been reduced in the reactive solution by the dissolution therein of part of the excessive sodium chlorid to such an extent, that only chlorid of ammonium crystallizes after the solution has been separated from the solid parts of the charge and cooled to normal temperature. The ammonium chlorid thus obtained is freed from adhering mother lye by known methods. In order to make the process continuous, the mother lyes remaining from the cold reactive solutions are reinforced by adding ammonium sulfate so that the necessary quantity of ammonium is present. The reinforced solutions are treated with an excess of sodium chlorid like the original solutions whereby the described solutions are obtained from which during cooling to normal temperature only ammonium chlorid crystallizes.

Having thus described my invention I claim as new and desire to secure by Letters Patent:

1. The process of producing chlorid of ammonium or sal ammoniac from sulfate of ammonium and chlorid of sodium in hot aqueous solution consisting in producing a solution containing both salts of which the chlorid of sodium is in excess of the molecular proportion necessary for the decomposition of the sulfate of ammonium and selecting such concentration that the finally obtained hot reactive solution contains less of the components of chlorid of ammonium than corresponds to a hot saturated reactive solution of same.

2. The process of producing chlorid of ammonium or sal ammoniac from sulfate of ammonium and chlorid of sodium in hot aqueous solution consisting in producing a solution containing both salts of which the chlorid of sodium is in excess of the molecular proportion necessary for the decomposition of the sulfate of ammonium and selecting such concentration that the finally obtained hot reactive solution contains less than 75 parts of the components of chlorid of ammonium to 100 parts of water and cooling said solution to normal temperature whereby chlorid of ammonium alone crystallizes.

3. The process of producing chlorid of ammonium or sal ammoniac from sulfate of ammonium and chlorid of sodium in hot aqueous solution consisting in producing a solution containing about 60 parts of sulfate of ammonium to 100 parts of water corresponding to about the components of 50 parts of chlorid of ammonium to 100 parts of water, heating said solution to a temperature of 70° C. or more, adding an excess of chlorid of sodium in solid form while stirring, transforming completely the sulfate of ammonium into the chlorid of ammonium, and cooling the thus obtained hot reactive solution which also contains free dissolved chlorid of sodium whereby only chlorid of ammonium crystallizes.

4. The process of producing chlorid of ammonium or sal ammoniac from sulfate of ammonium and chlorid of sodium in hot aqueous solution containing about 60 parts of sulfate of ammonium to 100 parts of water corresponding to about the components of 50 parts of chlorid of ammonium to 100 parts of water, heating said solution to a temperature of 70° C. or more, adding an excess of chlorid of sodium in solid form while stirring, to such an extent as necessary to obtain a reactive solution completely saturated with chlorid of sodium, transforming completely the sulfate of ammonium into the chlorid of ammonium and cooling the thus obtained hot reactive solution which also contains free dissolved chlorid of sodium to normal temperature whereby only chlorid of ammonium crystallizes.

Signed at Cologne, Germany, this 3d day of January 1908.

EMIL NAUMANN.

Witnesses:
 LOUIS VANDORY,
 BESSIE F. DUNLAP.